(12) United States Patent
Cheung et al.

(10) Patent No.: US 9,030,925 B2
(45) Date of Patent: May 12, 2015

(54) METHOD AND APPARATUS FOR SHARED MESH PROTECTION SWITCHING

(75) Inventors: Tae Sik Cheung, Daejeon (KR); Jeong-dong Ryoo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 177 days.

(21) Appl. No.: 13/522,635

(22) PCT Filed: Dec. 23, 2010

(86) PCT No.: PCT/KR2010/009295
§ 371 (c)(1),
(2), (4) Date: Jul. 17, 2012

(87) PCT Pub. No.: WO2011/087219
PCT Pub. Date: Jul. 21, 2011

(65) Prior Publication Data
US 2012/0294140 A1    Nov. 22, 2012

(30) Foreign Application Priority Data
Nov. 16, 2010    (KR) .......................... 10-2010-0113939

(51) Int. Cl.
*H04L 1/00* (2006.01)
*H04L 12/26* (2006.01)
(Continued)

(52) U.S. Cl.
CPC ...................................... *H04L 45/24* (2013.01)

(58) Field of Classification Search
CPC ......... H04L 45/22; H04L 45/24; H04L 45/50; H04L 41/0836; H04L 41/0654; H04L 41/0668; H04L 45/00; H04L 45/04; H04L 41/12; H04L 43/08; H04L 43/0805; H04L 43/0811; H04L 45/66; H04L 41/0816; H04L 41/082

USPC ......... 370/216, 217, 221, 241, 242, 243, 244, 370/245, 248; 709/223, 226, 238, 239, 240, 709/232, 235
See application file for complete search history.

(56) References Cited

U.S. PATENT DOCUMENTS 6,917,759 B2 * 7/2005 de Boer et al. .................... 398/5
7,450,497 B2 * 11/2008 Trudel et al. .................. 370/224
(Continued)

FOREIGN PATENT DOCUMENTS

| KR | 10-0369936 A | 1/2003 |
| KR | 10-0693052 A | 3/2007 |
| KR | 10-2008-0089285 A | 10/2008 |

OTHER PUBLICATIONS

RFC 5654, "Requirements of an MPLS Transport Profile", IETF, Sep. 2009, all pages.*

(Continued)

*Primary Examiner* — Kwang B Yao
*Assistant Examiner* — Adam Duda
(74) *Attorney, Agent, or Firm* — Rabin & Berdo, P.C.

(57) ABSTRACT

A method for protection switching in a shared node where protection resources of a plurality of end-to-end linear protection domain are shared is provided. The shared node receives a first protection switching event message notifying that a protection switching event occurs from a first node of a first end-to-end linear protection domain, and determines whether to prohibit protection switching on a second end-to-end linear protection domain by comparing a priority of the first end-to-end linear protection domain with a priority of the second end-to-end linear protection domain.

19 Claims, 15 Drawing Sheets

(51) Int. Cl.
*G06F 15/173* (2006.01)
*H04L 12/707* (2013.01)

(56) References Cited

U.S. PATENT DOCUMENTS

| | | | | |
|---|---|---|---|---|
| 7,630,297 | B2* | 12/2009 | Sestito et al. | 370/218 |
| 2004/0190444 | A1* | 9/2004 | Trudel et al. | 370/224 |
| 2005/0058060 | A1* | 3/2005 | Caldwell et al. | 370/216 |
| 2005/0099941 | A1* | 5/2005 | Sestito et al. | 370/228 |
| 2006/0159009 | A1* | 7/2006 | Kim et al. | 370/216 |
| 2007/0133398 | A1* | 6/2007 | Zhai | 370/228 |
| 2008/0095045 | A1 | 4/2008 | Owens et al. | |
| 2009/0129772 | A1* | 5/2009 | Trudel et al. | 398/8 |
| 2010/0110881 | A1 | 5/2010 | Ryoo et al. | |
| 2011/0075550 | A1* | 3/2011 | Sultan et al. | 370/217 |

OTHER PUBLICATIONS

Internet Draft 6378 (Bryant et al), "MPLS-TP Linear Protection", IETF, Dec. 2009, all pages.*
Internet Draft 6378 (Bryant et al), "MPLS-TP Linear Protection", IETF, Oct. 2011, all pages.*
Rouyer, "G.8031 Ethernet Linear Protection Switching", IEEE, May 2010, all pages.*
ITU-T G.8031/Y.1342, "Ethernet Linear Protection Switching", ITU-T, Nov. 2009, all pages.*
Translation of Written Opinion of The International Searching Authority, "PCT/KR2010/009295", WIPO, Sep. 2010, all pages.*
RFC 3945, "Generalize Multi-Protocol Label Switching (GMPLS) Architecture", IETF, Oct. 2004, all pages.*
RFC 4427, "Recovery (Protection and Restoration) Terminology for Generalized Multi-Protocol Label Switching (GMPLS)", IETF, Mar. 2006, all pages.*
RFC 4726, "A Framework for Inter-Domain Multiprotocol Label Switching Traffic Engineering", IETF, Nov. 2006, all pages.*
RFC 5298, "Analysis of Inter-Domain label Switched Path (LSP) Recovery", IETF, Aug. 2008, all pages.*
Ryoo, "KR10-2008/0029267", KIPO, Oct. 2008, all pages.*

* cited by examiner

METHOD AND APPARATUS FOR SHARED MESH PROTECTION SWITCHING

BACKGROUND OF THE INVENTION (a) Field of the Invention

The present invention generally relates to a method and apparatus for a shared mesh protection switching.

(b) Description of the Related Art

Protection switching is a mechanism for rerouting traffic as soon as possible when the traffic is blocked by a failure in the network. The protection switching is classified as linear protection switching and ring protection switching according to network topology, and the linear protection switching is again classified as 1+1, 1:1, 1:N or M:N protection switching.

Basic protection switching scheme is 1+1 scheme. In the 1+1 scheme, there is a traffic path (hereinafter referred to as "protection path") for protecting end-to-end traffic path (hereinafter referred to as "working path").

According to the 1+1 scheme, under normal condition, a transmitting node simultaneously transmits traffic over the working path and the protection path, and a receiving node receives the traffic from the working path. When a failure occurs, the receiving node switches over to the protection path and receives the traffic from the protection path. The 1+1 scheme uses a simple protocol, but has a drawback of wasting half of network resources for the protection path.

The 1:1 scheme allocates one protection path for one working path, like the 1+1 scheme. However, in the 1:1 scheme, the traffic is transmitted over only the working path under normal condition, and the protection path is used when the failure occurs. Since the protection path can be used for transmitting less important traffic that does not need the protection switching under normal condition, the 1:1 scheme is more efficient than the 1+1 scheme.

The M:N scheme allocates M protections paths for protecting N working paths. In the M:N scheme, the network resources are used more efficiently than the 1:1 scheme. As M becomes smaller than N, the efficiency increases. However, in the M:N scheme, traffic can be protected only when a failure occurs in M or less working paths among the N working paths.

The 1:N scheme is a special case of M=1 in the M:N scheme, and operates in the same manner as the M:N scheme.

All of the protection switching schemes operates in one end-to-end linear protection domain. That is, two ends of traffic and working and protection paths for connecting the two ends are defined as one end-to-end linear protection domain, and a protection switching procedure is operated by exchanging messages between the two ends according to a protocol.

In the networks, various protection domains having different end nodes exist, but there is no mechanism that can coordinate the use of network resources between the end-to-end linear protection domains. As a result, the protection paths of end-to-end linear protection domains cannot share network resources.

Further, since priorities are not defined in the end-to-end linear protection domains according to the existing protection switching scheme, a specific end-to-end linear protection domain cannot be protected preferentially when limited network resources are shared.

SUMMARY OF THE INVENTION

Aspects of the present invention provide a shared mesh protection switching method and apparatus for allowing protection paths of a plurality of end-to-end linear protection domains to share network resources.

An aspect of the present invention provides method for a protection switching in a shared node where protection resources of a plurality of end-to-end linear protection domains are shared. The method includes receiving a first protection switching event message notifying that a protection switching event occurs from a first node in a first end-to-end linear protection domain, and determining whether to prohibit protection switching on a second end-to-end linear protection domain by comparing a priority of the first end-to-end linear protection domain with a priority of the second end-to-end linear protection domain.

When determining whether to prohibit protection switching, a first protection locking message requesting the Lockout of Protection (LoP) may be transmitted to a second node of the second end-to-end linear protection domain when the priority of the second end-to-end linear protection domain is lower than the priority of the first end-to-end linear protection domain. The second node may be an end node of the second end-to-end linear protection domain.

The second node may process the LoP in the second end-to-end linear protection domain by the first protection locking message.

A transmission state of the first end-to-end linear protection domain may be set to a protection path.

The method may further include receiving a second protection switching event message for notifying that the protection switching event is cleared in the first end-to-end linear protection domain, from the first node, and transmitting a second protection locking message requesting clearance of the LoP to the second node of the second end-to-end linear protection domain.

The second node may clear the LoP in the second end-to-end linear protection domain by the second protection locking message.

When determining whether to process the LoP, the LoP may not be processed in the second end-to-end linear protection domain, when a protection switching priority of the second end-to-end linear protection domain is higher than a protection switching priority of the first end-to-end linear protection domain.

When determining whether to prohibit protection switching, a first protection locking message requesting the LoP may be transmitted to a second node of the second end-to-end linear protection domain when a protection switching priority of the second end-to-end linear protection domain is equal to a protection switching priority of the first end-to-end linear protection domain.

The shared node may be a shared end node (SEN) of a protection path that is shared by the first and the second end-to-end linear protection domains.

The first protection switching event message may include information on amount of network resources required to perform the protection switching in the first end-to-end linear protection domain.

Another aspect of the present invention provides a method for a protection switching in a node in a first end-to-end linear protection domain among a plurality of end-to-end linear protection domains. The method includes receiving a protection locking message from a first shared node sharing a protection path of the first end-to-end linear protection domain and a second end-to-end linear protection domain when a protection switching priority of the first end-to-end linear protection domain is lower than a protection switching priority of the second end-to-end linear protection domain, and processing or clearing an LoP in the first end-to-end linear protection domain according to the protection locking message.

Yet another aspect of the present invention provides a method for protection switching in a first node of a network where a plurality of end-to-end linear protection domains shares protection resources. The method includes comparing a priority of a first end-to-end linear protection domain with a priority of a second end-to-end linear protection domain when a protection switching event occurs in the first end-to-end linear protection domain, and processing an LoP on the second end-to-end linear protection domain when the priority of the second end-to-end linear protection domain is lower than the priority of the first end-to-end linear protection domain.

Still another aspect of the present invention provides a shared mesh protection switching apparatus of a network where a plurality of end-to-end linear protection domains shares protection resources. The apparatus includes a priority comparator configured to compare a priority of a first end-to-end linear protection domain with a priority of a second end-to-end linear protection domain when protection switching event occurs in the first end-to-end linear protection domain, and a controller configured to determine whether to prohibit protection switching on the second end-to-end linear protection domain by comparing the priority of the first end-to-end linear protection domain with the priority of the second end-to-end linear protection domain.

As such, according to an embodiment of the present invention, the protection paths of the plurality of end-to-end linear protection domains can share the network resources. Further, even though the network resources for protection paths are limited, the end-to-end linear protection domain having higher priority can be protected first.

DETAILED DESCRIPTION OF THE EMBODIMENTS

Figure 1:
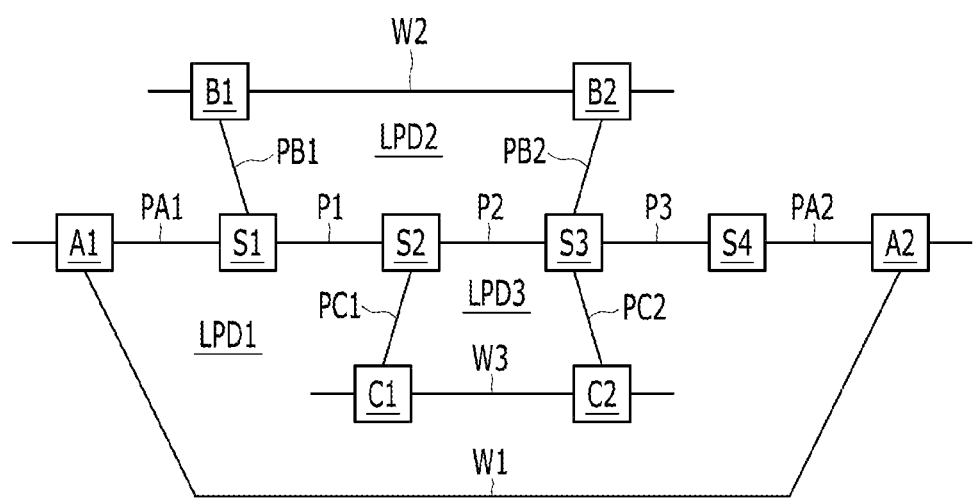
FIG. 1 shows an example of a network using a shared mesh protection switching method according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Figure 2:
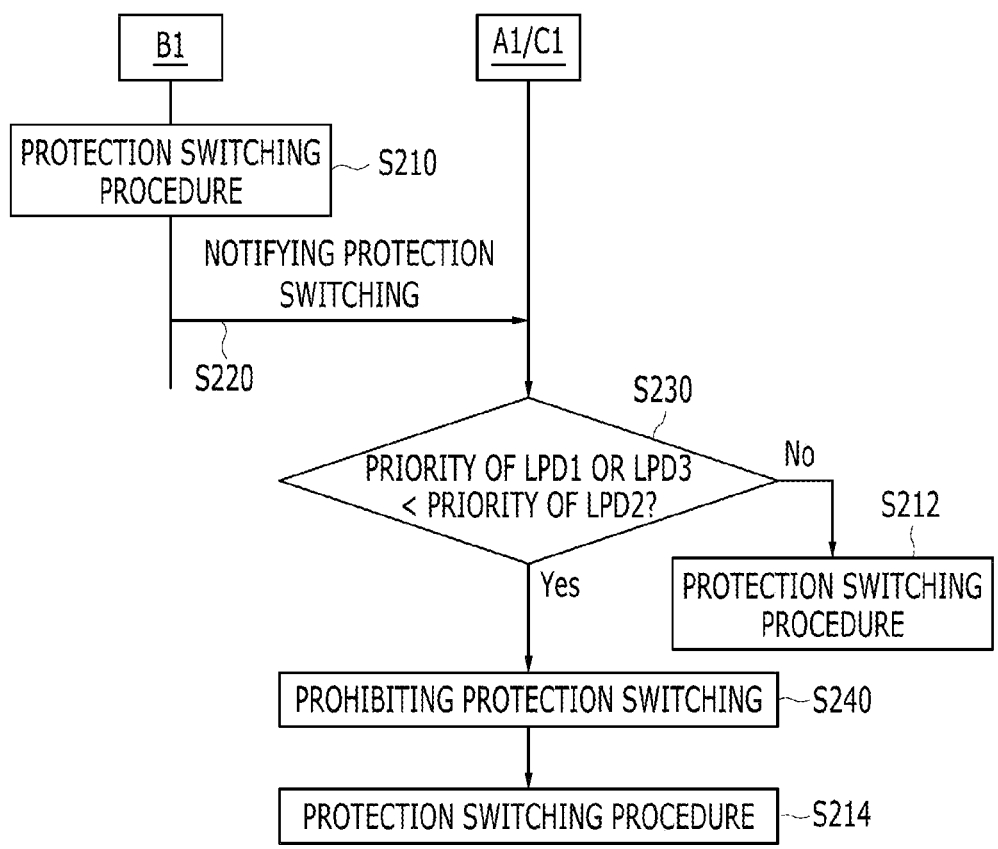
FIG. 2, FIG. 4, FIG. 7 and FIG. 8 are schematic flowcharts showing a shared mesh protection switching method according to an embodiment of the present invention.
Figure 3:
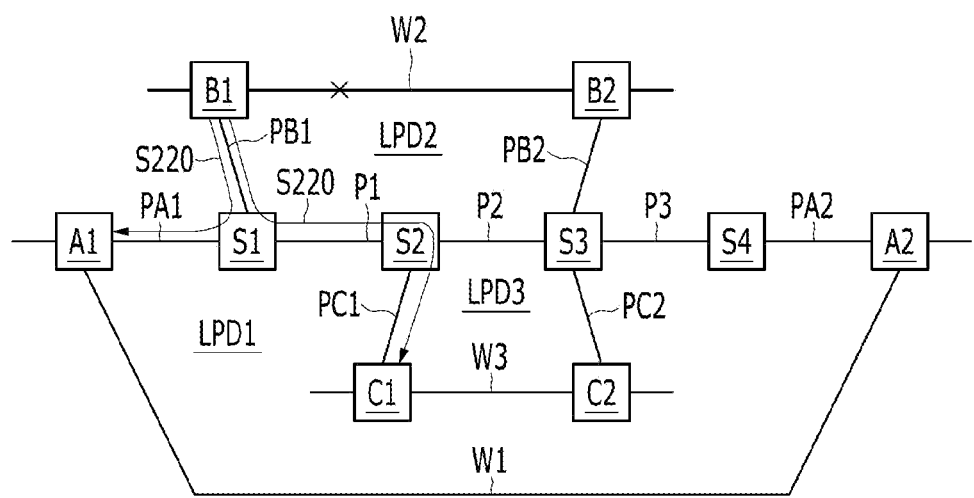
FIG. 3, FIG. 5 and FIG. 6 show examples of protection switching occurrence in the network shown in FIG. 1.

FIG. 1 shows an example of a network using a shared mesh protection switching method according to an embodiment of the present invention. FIG. 2 is a schematic flowchart showing a shared mesh protection switching method according to an embodiment of the present invention. FIG. 3 shows an example of protection switching occurrence in the network shown in FIG. 1.

Referring to FIG. 1, an example of the network includes a plurality of end-to-end linear protection domains LPD1, LPD2, and LPD3. The networks may be Ethernet network, Provider Backbone Bridge Traffic Engineering (PBB-TE) network, or MultiProtocol Label Switching (MPLS) network. For example, a shared mesh protection switching method may be applied to an end-to-end linear protection domain defined by International Telecommunication Union Telecommunication standardization sector (ITU-T) recommendation G.8031 in the Ethernet network, to an end-to-end linear protection domain composed of point-to-point PBB-TE Service Instance (TESI) defined by Institute of Electrical and Electronics Engineers (IEEE) 802.1Qay in the PBB-TE network, and to an end-to-end linear protection domain where a working path and a protection path exist between end node of traffic and each end node in MPLS Transport Profile (MPLS-TP) network.

The end-to-end linear protection domain LPD1 includes two end nodes A1 and A2, a working path W1 connecting the two end nodes A1 and A2, a protection path connecting the two end nodes A1 and A2 via a path PA1, a node S1, a path P1, a node S2, a path P2, a node P3, a node S4, and a path PA2.

Another end-to-end linear protection domain LPD2 includes two end nodes B1 and B2, a working path W2 connecting the two end nodes B1 and B2, and a protection node connecting the two end node B1 and B2 via a path PB1, the node S1, the path P1, the node S2, the path P2, the node S3, and a path PB2.

Yet another end-to-end linear protection domain LPD3 includes two end nodes C1 and C2, a working path W3 connecting the two end nodes C1 and C2, and a protection path connecting the two end node C1 and C2 via a path PC1, the node S2, the path P2, the node S3, and a path PC2.

In FIG. 1, the path P1 is shared a the protection path by the end-to-end linear protection domains LPD1 and LPD2, and the path P2 is shared as the protection path by the end-to-end linear protection domains LPD1, LPD2, and LPD3.

The two end nodes S1 and S3 of a path including the path P1, the node S2 and the path P2 are shared nodes for the end-to-end linear protection domains LPD1 and LPD2, and the two end nodes S2 and S3 of the path P2 are shared nodes for the end-to-end linear protection domains LPD1, LPD2 and LPD3.

In this case, it is assumed that the end-to-end linear protection domain LPD1 has the highest priority, i.e. protection switching priority, and end-to-end linear protection domain LPD3 has the lowest priority.

Referring to FIG. 2 and FIG. 3, for example, if a failure occurs in the working path W2 of the end-to-end linear protection domain LPD2 or protection switching is requested by an administrator command, the end node B1 or B2 of the end-to-end linear protection domain LPD2 performs the protection switching procedure (S210)

The protection switching may be performed by a protection switching scheme defined by the network to which the end node B1 or B2 belongs.

When protection switching occurs, the end node B1 or B1 notifies the protection switching to end nodes of the end-toend linear protection domains LPD1 and LPD3 (S220). For example, as shown in FIG. 3, the end node B1 may notify the protection switching to the end node A1 of the end-to-end linear protection domain LPD1 via the path PB1, the node S1 and the path PA1, and to the end node C1 of the end-to-end linear protection domain LPD3 via the path PB1, the node S1, the path P1, the node S2 and the path PC1.

After receiving notification of the protection switching, the end node A1 or C1 compares the priorities of its end-to-end linear protection domain LPD1/LPD3 with the priority of the end-to-end linear protection domain LPD2 that has notified the protection switching (S230). When the priority of the end-to-end linear protection domain LPD1 is higher than the end-to-end linear protection domain LPD2 that has notified the protection switching, the end node A1 neglects the notification of the protection switching and processes the protection switching (S212). Since the end node A1 neglects the protection switching event, the protection switching function is operated in the end nodes A1 and A2 when a failure occurs in the working path W1 of the end-to-end linear protection domain LPD1. For example, the end node A1 and A2 may transmit and receive traffic via the protection path defined by the path PA1, the node S1, the path P1, the node S2, the path P2, the node S3, the node S4 and the path PA2. Further, when a failure occurs, the end nodes A1 and A2 notify the protection switching event to other end-to-end linear protection domains LPD2 and LPD3 as described in the step S220.

Meanwhile, when the priority of the end-to-end linear protection domain LPD3 is lower than the end-to-end linear protection domain LPD2 that has notified the protection switching, the end node C1 prohibits protection switching by the protection switching notification (S240) and follows the protection switching procedure (S214). In this case, though the failure occurs in the working path W3 of the end-to-end linear protection domain LPD3, the protection switching function is not operated in the end nodes C1 and C2. To prevent the protection switching function in the end node C2, for example, the end node C1 may transmit a LOCKOUT message defined in the protection switching standard such as the Ethernet, PBB-TE, or MPLS-TP network to the end node C2, or the end node B1 may notify the protection switching event to both of the end nodes C1 and C2.

In the mean time, when the priorities of the end-to-end linear protection domains LPD1, LPD2 and LPD3 are same, the end-to-end linear protection domain notifying the protection switching event first due to first occurrence of the failure may have the priority. When two or more end-to-end linear protection domains having the same priority notify the protection switching event due to the simultaneous occurrence of the failure, the priority is granted according to an identifier of the end-to-end linear protection domains or any predetermined identifier.

Figure 4:
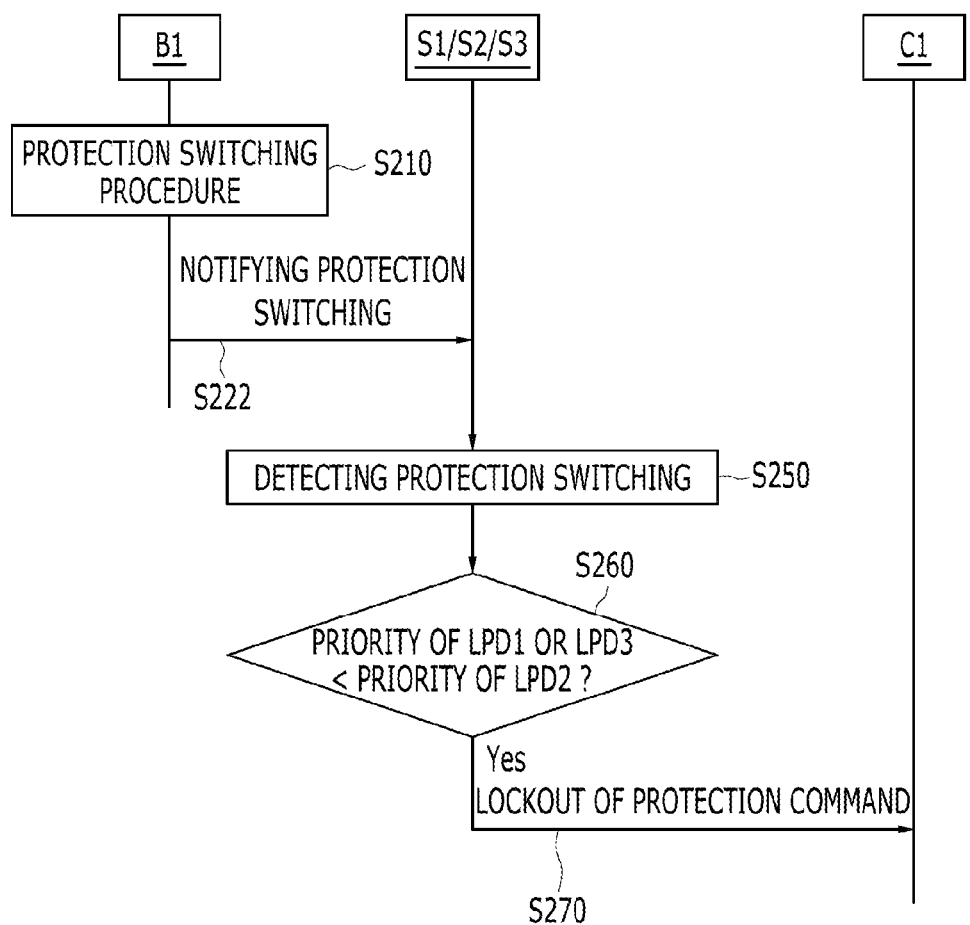
Figure 5:
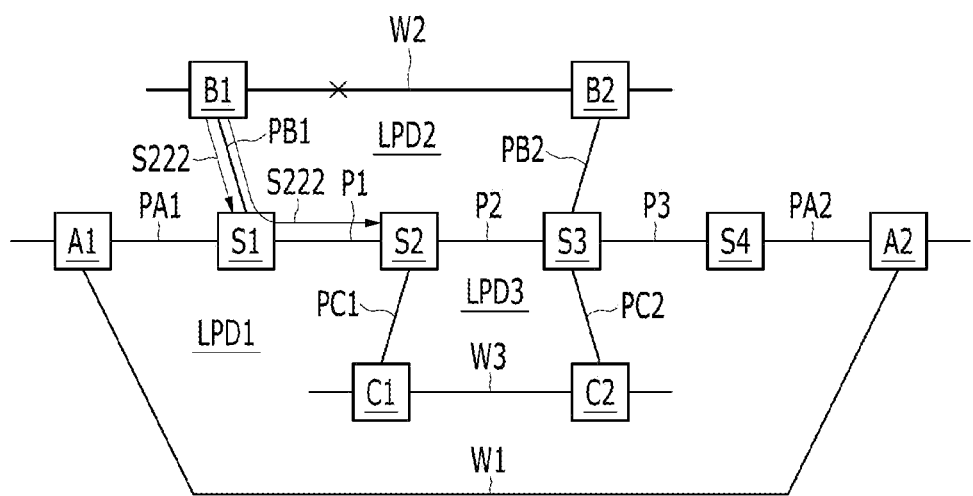
Figure 6:
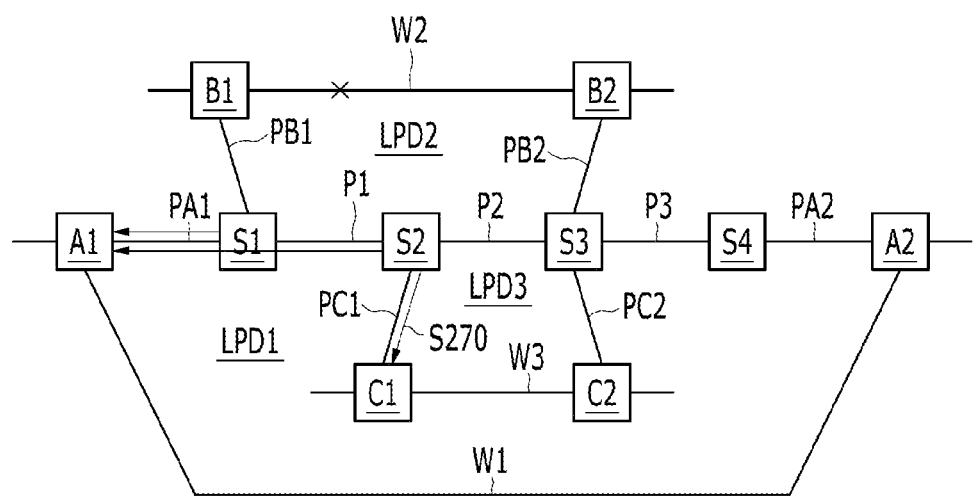

FIG. 4 is a schematic flowchart of a shared mesh protection switching method according to an embodiment of the present invention, and FIG. 5 and FIG. 6 show examples of protection switching occurring in the network shown in FIG. 1.

Referring to FIG. 4 and FIG. 5, for example, when a failure occurs in the working path W2 of the end-to-end linear protection domain LPD2, the end node B1 or B2 of the end-to-end linear protection domain LPD2 performs the protection switching procedure, as described above (S210).

When the protection switching occurs, the end node B1 or B1 notifies the protection switching to the shared nodes S1, S2 and S3 that belong to the end-to-end linear protection domain LPD2 (S222). The end node B1 or B2 may notify the protection switching to any one (for example, S1) of the shared nodes S1 and S3 that are shared by the end-to-end linear protection domains LPD1 and LPD2, and to any one (for example, S2) of the shared nodes S2 and S3 that are shared by the end-to-end linear protection domains LPD2 and LPD3. In this case, the protection switching may be notified by transmitting a protection switching message which are defined in the protection switching standard such as Ethernet, PBB-TE, or MPLS-TP network and are exchanged between end nodes, to the shared node, or by using a protection switching event message. The protection switching event message may be a message defined for a shared mesh protection switching method according to an embodiment of the present invention, regardless of the existing protection switching method.

The shared node S1, S2, or S3 detects the protection switching by the protection switching notification from the end-to-end linear protection domains that share the node S1, S2, or S3 (S250).

When the shared node S1, S2, or S3 detects the protection switching, it compares the priority of the end-to-end linear protection domain LPD2 where the protection switching has occurred with the priority of other end-to-end linear protection domain LPD1 or LPD3 that shares itself (S260). The shared node S1, S2, or S3 transmits a message for prohibiting protection switching to the end-to-end linear protection domain LPD3 that has lower priority than the end-to-end linear protection domain LPD2 where the protection switching has occurred (S270). The shared node S1, S2, or S3 may transmit a message for prohibiting protection switching to an end-to-end linear protection domain that has the same priority as the end-to-end linear protection domain LPD2 where the protection switching has occurred.

In this case, the protection path may be prohibited from being used by a LOCK message defined in an Operations, Administrations and Maintenance (OAM) standard such as Ethernet or MPLS-TP network and so on. Alternatively, the protection switching may be prohibited by a LOCKOUT message defined in the protection switching standard such as Ethernet, PBB-TE, or MPLS-TP network. Alternatively, the LOCKOUT request message may allow an end node to transmit the LOCKOUT message defined in the protection switching standard such Ethernet, PBB-TE, or MPLS-TP network to a peer end node, thereby prohibiting protection switching. Instead of the LOCK request message, other message may be defined and used for a shared mesh protection method according to an embodiment of the present invention.

For example, as shown in FIG. 5, since the end-to-end linear protection domain LPD3 has lower priority to the end-to-end linear protection domain LPD2, the shared node S2 may transmits a command to prohibit protection switching to the end node C1 of the end-to-end linear protection domain LPD3 (S270). In addition, since the end-to-end linear protection domain LPD1 has the higher priority to the end-to-end linear protection domain LPD2, the shared nodes S1 and S2 do not command the end node A1 of the end-to-end linear protection domain LPD1 to prohibit protection switching.

The steps S250, S260, and S270 for detecting and prohibiting protection switching may be performed in any one of the shared nodes. Referring to an example shown in FIG. 6, the node S1 of the shared nodes S1 and S3 sharing the two end-to-end linear protection domains LPD1 and LPD2 may detect and prohibit protection switching for the end-to-end linear protection domains LPD1 and LPD2. The node S2 of the shared nodes S2, and S3 sharing the three end-to-end linear protection domains LPD1, LPD2, and LPD3 may detect and prohibit protection switching for the end-to-end linear protection domains LPD1, LPD2, and LPD3.

Meanwhile, the shared node S1, S2, or S3 may, by itself, detect the protection switching event of the end-to-end linear protection domain sharing itself, differently from the step S250. The shared node may intercept a protection switching message exchanged between the end nodes or indirectly detect which end-to-end linear protection domain uses protection path by detecting amount of traffic flowing via the protection path, thereby detecting the protection switching event.

In this case, the step S222 for notifying the protection switching at the end node may be skipped. Then, the shared node may compare the priorities according to the detection of the protection switching (S260), and command to prohibit protection switching (S270), and the end node may perform only the protection switching procedure (S210).

Figure 7:
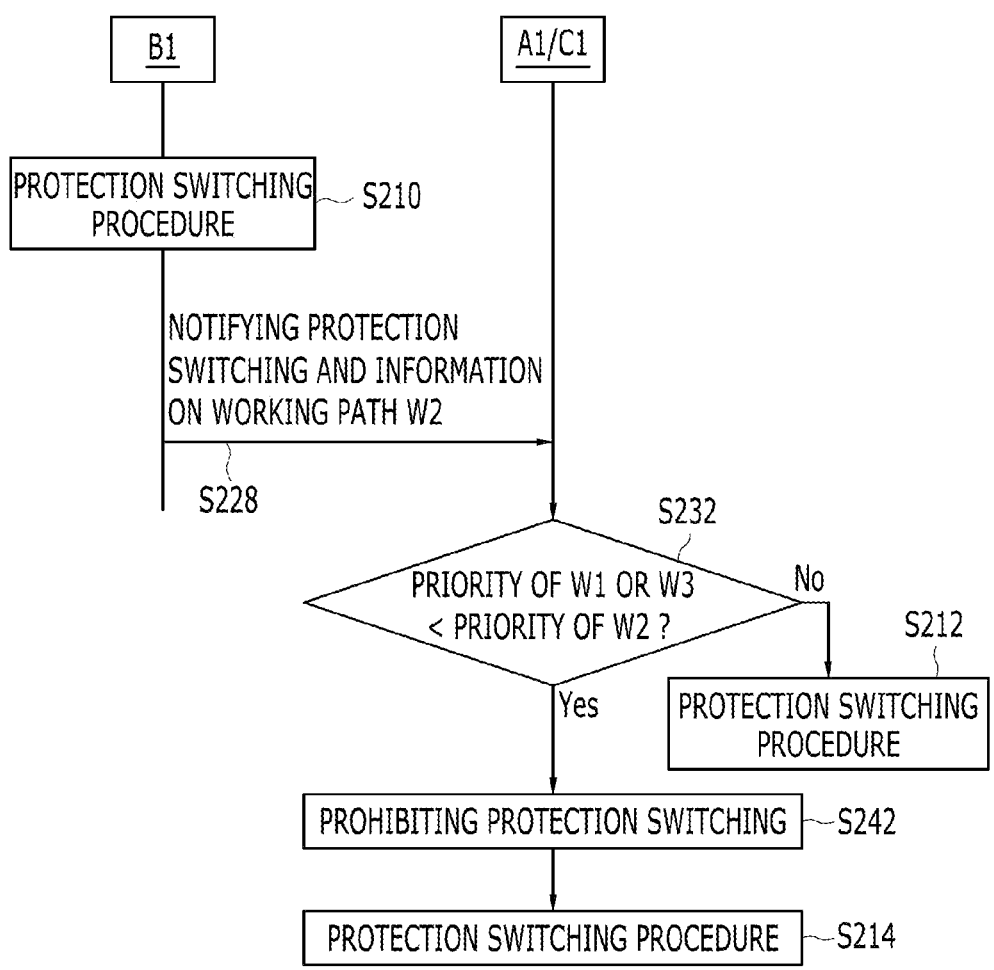

FIG. 7 is a schematic flowchart of a shared mesh protection switching method according to an embodiment of the present invention.

Referring to FIG. 7, when a protection switching occurs, the end node B1 or B2 notifies the protection switching along with the information on the working path W2 where the protection switching has occurred to the end-to-end linear protection domains LPD2 and LPD3 sharing network resources to allocate the protection path, differently from the embodiment shown in FIG. 2 (S228). As described in the embodiment shown in FIG. 4, the end node B1 or B2 may only notify to the shared node instead of directly notifying the protection switching to the end-to-end linear protection domains LPD2 and LPD3, and then the shared node may forward the notification to other end-to-end linear protection domain.

After receiving the notification of the protection switching, the end node A1 or C1 compare the priority of the working path W2 with the priority of the working path W1 or W3 of the end-to-end linear protection domain LPD1 or LPD3 to which it belongs (S232). When the priority of the working path W3 in the end-to-end linear protection domain LPD3 to which the end node C1 belongs is low, the end node C1 prohibits protection switching according to the protection switching notification (S242).

According to ITU-T recommendation G.808.1, the working path is classified by the number from 1 to 255 in the end-to-end linear protection domain. The classification number may be used as priority information of the working path. Alternatively, if working path classifier is provided in the network such as Ethernet, MPLS-TP, or PBB-TE network, it may be used as priority information of the working path. Alternatively, when a plurality of end-to-end linear protection domains use the same classifier but have different priorities, the working path classifier may be randomly mapped to the priority within each end-to-end linear protection domain.

As described above with reference to FIG. 1 to FIG. 7, according to embodiments of the present invention, network resource can be efficiently used because the use of protection path can be allowed or prohibited according to the priorities of the end-to-end linear protection domain or the working path, though the protection paths of the end-to-end linear protection domains share network resource.

Figure 8:
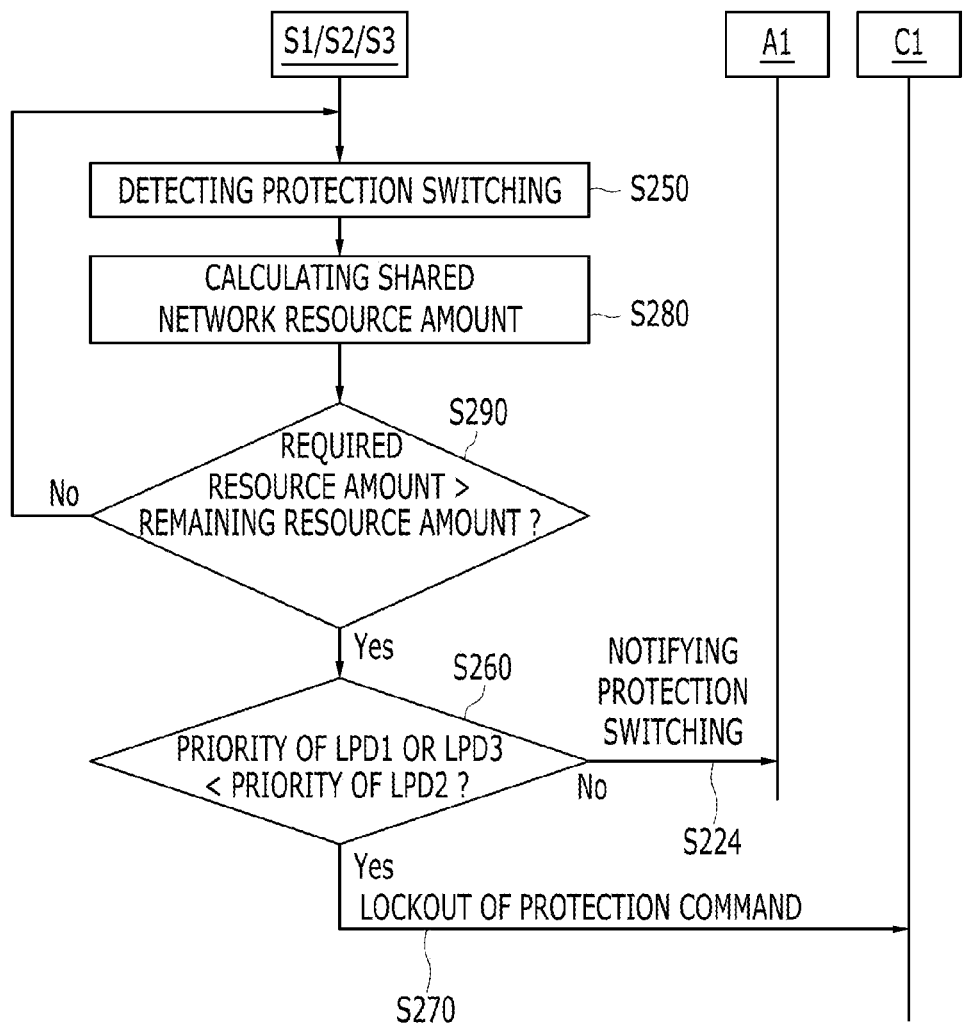

FIG. 8 is a schematic flowchart of a shared mesh protection switching method according to an embodiment of the present invention.

Referring to FIG. 8, differently from the embodiment shown in FIG. 4, when the shared node S1, S2, or S3 detects the protection switching (S250), it calculates the amount of remaining shared network resources (S280), and compare the calculated amount with the amount of network resources that are required to allocate a protection path of the end-to-end linear protection domain where the protection switching has occurred (S290).

When the amount of network resources that are required to allocated the protection path of the end-to-end linear protection domain where the protection switching has occurred is larger than the amount of remaining shared network resources, the shared node S1, S2, or S3 compares the priorities of the end-to-end linear protection domains LPD1, LPD2 and LPD3 and performs a lockout of the protection command (S260, S270). Meanwhile, when the amount of the required network resources is smaller than the amount of remaining shared network resources, the shared node does not prohibit protection switching. The shared node may simply notify the protection switching to the end nodes A1 and C1 of the end-to-end linear protection domains LPD1 and LPD3. And the above process may be continuously repeated according to detection of the protection switching.

According to an embodiment shown in FIG. 8, in the case that a large amount of shared network resources is allocated so as to allow the protection switching to be performed in at least one end-to-end linear protection domain, additional protection switching may be allowed when the shared network resources are available in accordance with the protection switching priorities of the end-to-end linear protection domains and the state of the network resources.

Hereinafter, a shared mesh protection switching method in MPLS-TP network among various networks will be described with reference to FIG. 9 to FIG. 14.

Figure 9:
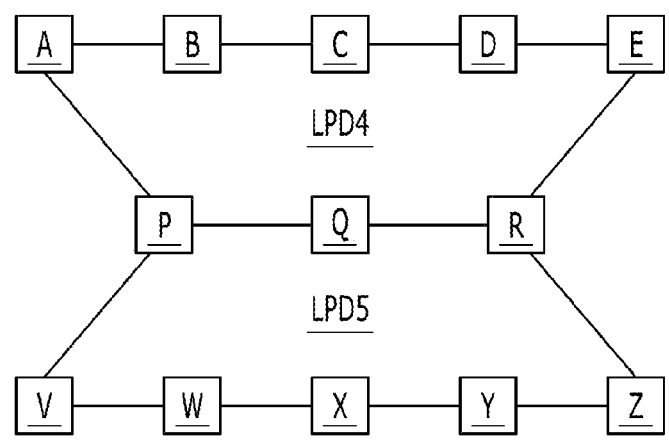
FIG. 9 and FIG. 10 show examples of MPLS-TP networks using a shared mesh protection switching method according to an embodiment of the present invention.
Figure 10:
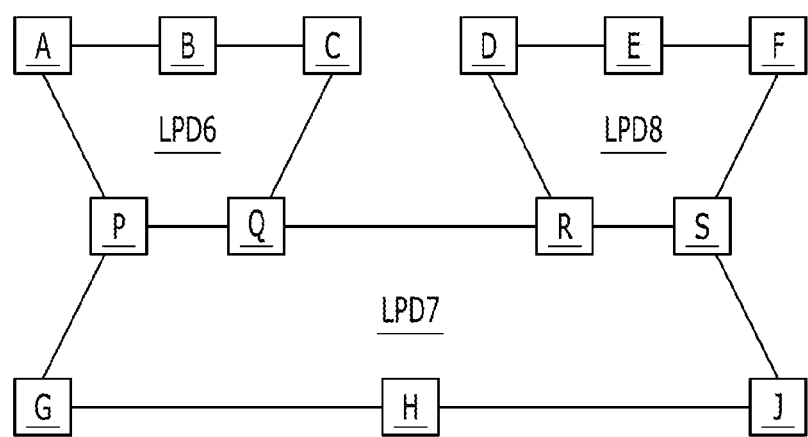

FIG. 9 and FIG. 10 show examples of MPLS-TP networks using a shared mesh protection switching method according to an embodiment of the present invention.

In MPLS-TP network, a protection domain for protecting a plurality of point-to-point or point-to-multipoint label switch paths (LSPs) may be defined as a shared mesh protection domain. The shared mesh protection domain includes a plurality of end-to-end linear protection domains described in FIG. 1 to FIG. 8. Each end-to-end linear protection domain shares protection resource with other end-to-end linear protection domain. The shared protection resource may be a node, link, transport path segment or concatenated transport path segment. A general end-to-end linear protection protocol functions runs within each end-to-end linear protection domain, and the shared mesh protection switching method described with reference to FIG. 1 to FIG. 8 runs within the shared mesh protection domain. In FIG. 9 to FIG. 14, a shared mesh protection switching method described with reference to FIG. 4 will be described as an example applied to MPLS-TP network.

Referring to FIG. 9, an example of the shared mesh protection domain includes two end-to-end linear protection domains LPD4 and LPD5. One end-to-end linear protection domain LPD4 includes a working path composed of nodes A, B, C, D, and E, and a protection path composed of nodes A, P, Q, R, and E. The other end-to-end linear protection domain LPD5 includes a working path composed of nodes V, W, X, Y, and Z, and a protection path composed of nodes V, P, Q, R, and Z. The protection paths of the two end-to-end linear protection domains LPD4 and LPD5 share a protection segment composed of the shared nodes P, Q, and R.

As described above, the protection switching priorities are defined for the end-to-end linear protection domains that have the protection path sharing the same protection resources P, Q and R. According to the protection switching priorities, the protection path of the end-to-end linear protection domain having higher priority can displace the protection path of other end-to-end linear protection domain already using the shared protection resources and protect its own working path.

The protection switching priorities may be provisioned by a network management system (not shown). By default, equal protection switching priorities of the plurality of end-to-end linear protection domains may be assumed resulting in first-come first-served recovery. If failures occur simultaneously in the plurality of the end-to-end linear protection domains, a priority may be given by a predefined identifier.

The shared nodes that are shared by the protection paths of the plurality of the end-to-end linear protection domains are classified as a shared start node (SSN) and a shared end node (SEN). The SSN is defined as a first node of a unidirectional shared protection segment. In the example of FIG. 9, since the shared segment is shared by unidirectional protection paths A→P→Q→R→E and V→P→Q→R→Z is P→Q→R, the shared node P is the SSN.

The SEN is defined as the last node of the unidirectional shared protection segment. In the example of FIG. 9, since the shared segment is shared by unidirectional protection paths A→P→Q→R→E and V→P→Q→R→Z is P→Q→R, the shared node R is the SEN. The SEN involves in shared mesh protection operation according to an embodiment of the present invention to coordinate the use of unidirectional shared protection segment. The SSN and SEN may act as a maintenance entity group intermediate point (MIP).

The shared protection segments, SSN, SEN and the protection paths that share the shared protection segments in the example of FIG. 9 are represented as Table 1.

TABLE 1

| Protection paths | Shared protection segments | SSN | SEN |
|---|---|---|---|
| A→P→Q→R→E V→P→Q→R→Z | P→Q→R | P | R |
| E→R→Q→P→A Z→R→Q→P→V | R→Q→P | R | P |

Referring to FIG. 10, an example of the shared mesh protection domain includes three end-to-end linear protection domains LPD6, LPD7, and LPD8. One end-to-end linear protection domain LPD6 includes a working path composed of nodes A, B, and C, and a protection path composed of nodes A, P, Q, and C. Another end-to-end linear protection domain LPD7 includes a working path composed of nodes G, H, and J, and a protection path composed of nodes G,P,Q,R,S, and J. The other end-to-end linear protection domain LPD8 includes a working path composed of nodes D, E, and F, and a protection path composed of nodes D,R,S, and F. The protection paths of the two end-to-end linear protection domains LPD6 and LPD7 share a protection segment composed of the shared nodes P and Q, and the protection paths of the two end-to-end linear protection domains LPD7 and LPD8 share a protection segment composed of the shared nodes R and S.

The shared protection segments, SSN, SEN and the protection paths that share the shared protection segments in the example of FIG. 10 are represented as Table 2.

TABLE 2

| Protection paths | Shared protection segments | SSN | SEN |
|---|---|---|---|
| A→P→Q→C G→P→Q→R→S→J | P→Q | P | Q |
| C→Q→P→A J→S→R→Q→P→G | Q→P | Q | P |
| D→R→S→F G→P→Q→R→S→J | R→S | R | S |
| F→S→R→D J→S→R→Q→P→G | S→R | S | R |

A shared mesh protection switching method according to an embodiment of the present invention performs a function of sending a protection switching event message to the SEN when a protection switching event occurs at the end-to-end linear protection domain, and a function of taking a protection locking message from the SEN and generating a lockout of protection (LoP) command This shared mesh protection switching method may utilize the existing end-to-end linear protection switching operation without any changes, by adding the above two functions to the existing end-to-end linear protection switching operation.

In this case, when an end node of any working path detects a failure condition, the end node triggers the protection switching by exchanging end-to-end linear protection switching protocol message with its peer end node at a working/protection path as described in S210 in FIG. 4. Simultaneously, the end node notifies the protection state change to the SEN by sending the protection switching event message to the SEN. That is, in S222 in FIG. 4, the shared node that receives the protection switching report is the SEN. The protection switching event message is transmitted to SEN when the end node changes its selector state from the working path to the protection path or vice versa.

If any end-to-end linear protection domain operates in a bidirectional protection switching, both end nodes change their selector state even when a unidirectional failure is detected in one end node. Therefore, both end nodes transmit the protection switching message to their corresponding SENs.

If a SEN receives a message notifying that a protection switching has begun in an end-to-end linear protection domain as described in S260 in FIG. 4, the SEN compares the protection switching priority of the end-to-end linear protection domain sending the message with the protection switching priority of other end-to-end linear protection domain sharing same protection segment. The SEN does not take an action on the end-to-end linear protection domain having a higher priority, but sends a protection locking message to the end-to-end linear protection domain having an equal or lower priority to prevent any protection switching to be occurred, as described in S270 in FIG. 4.

When an end node receives the protection locking message from SEN, the end node takes it as an input of the end-to-end linear protection switching, and follows the linear protection switching procedure to process end-to-end LoP command. Since the LoP command is a request/state having the highest priority in the linear protection switching protocol, it prohibits any further protection switching in the end-to-end linear protection domain. If an end-to-end linear protection domain having lower priority currently uses the shared protection segment, it stops occupying the protection resource (bandwidth) by the LoP command.

When the SEN receives a protection switching event message notifying clearance of the protection state from any end node, the SEN sends a protection locking message to the end node to clear the LoP command.

Hereinafter, a shared mesh protection switching method in MPLS-TP network according to an embodiment of the present invention will be described with reference to FIG. 11 to FIG. 14. In FIG. 11 to FIG. 14, the shared mesh protection domain shown in FIG. 10 is used as an example of for describing an embodiment of the present invention.

Figure 11:
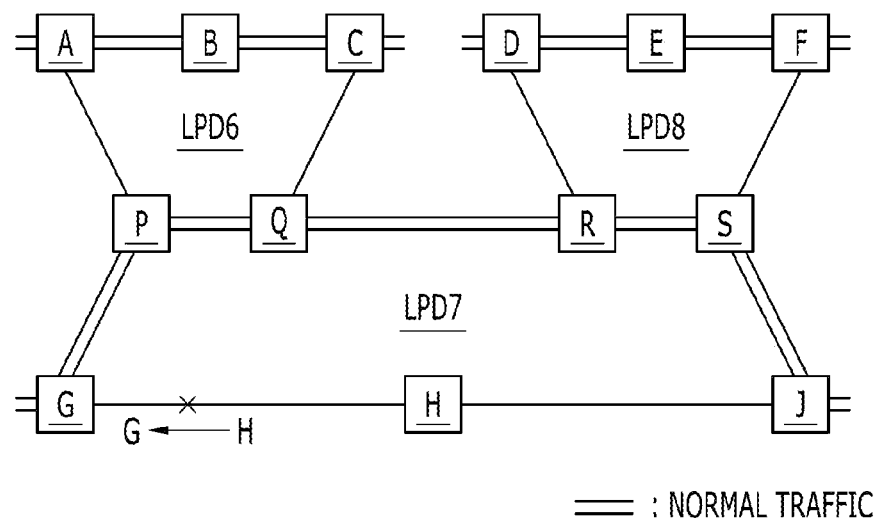
FIG. 11 and FIG. 13 show examples of protection switching occurrence in the network shown in FIG. 10.
Figure 12:
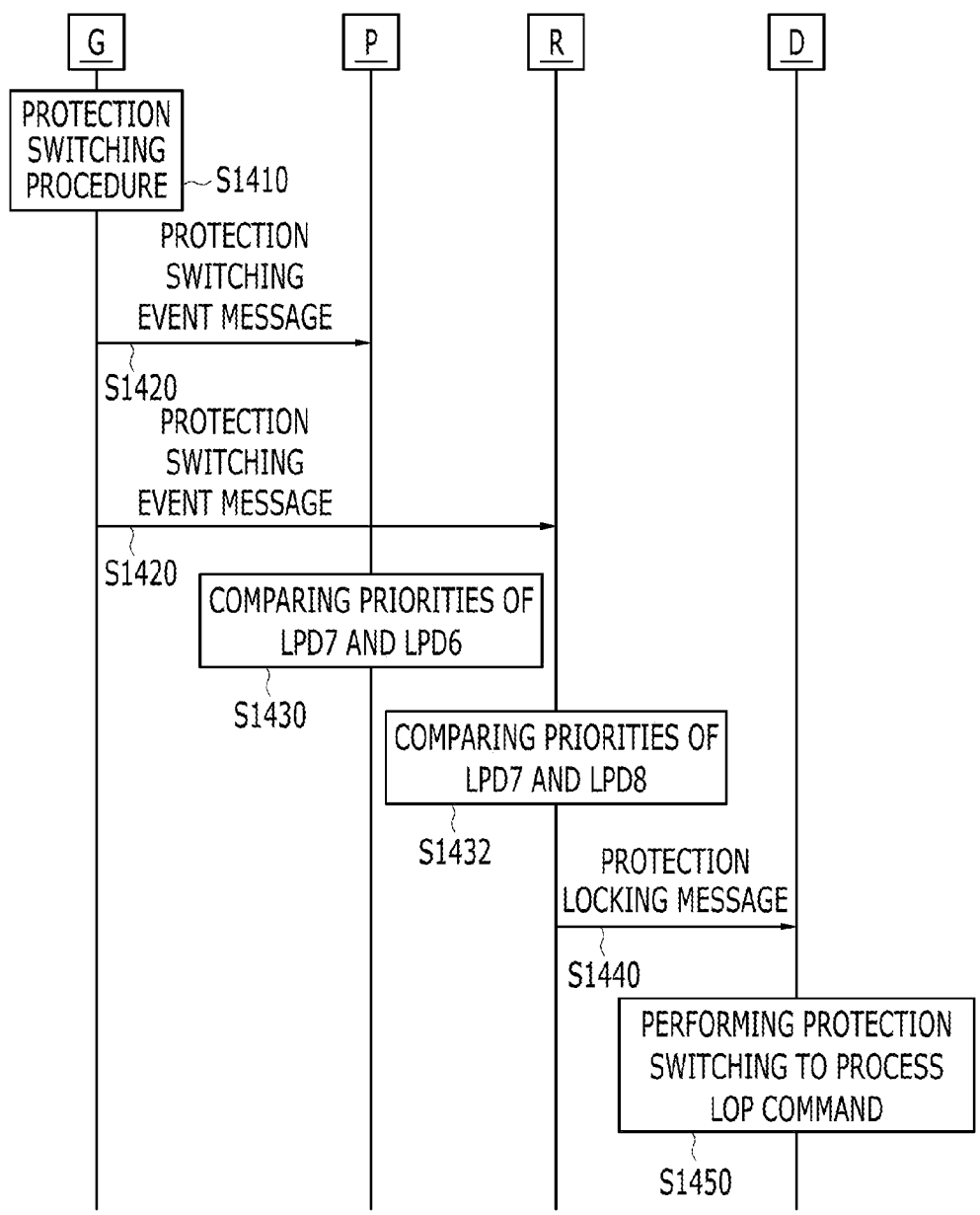
FIG. 12 and FIG. 14 are schematic flowcharts of a shared mesh protection switching method according to an embodiment of the present invention.
Figure 13:
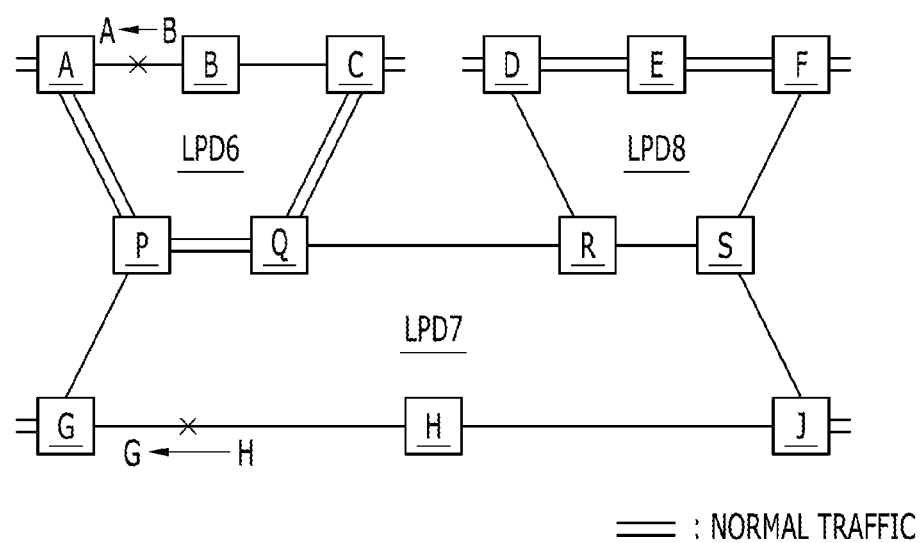
Figure 14:
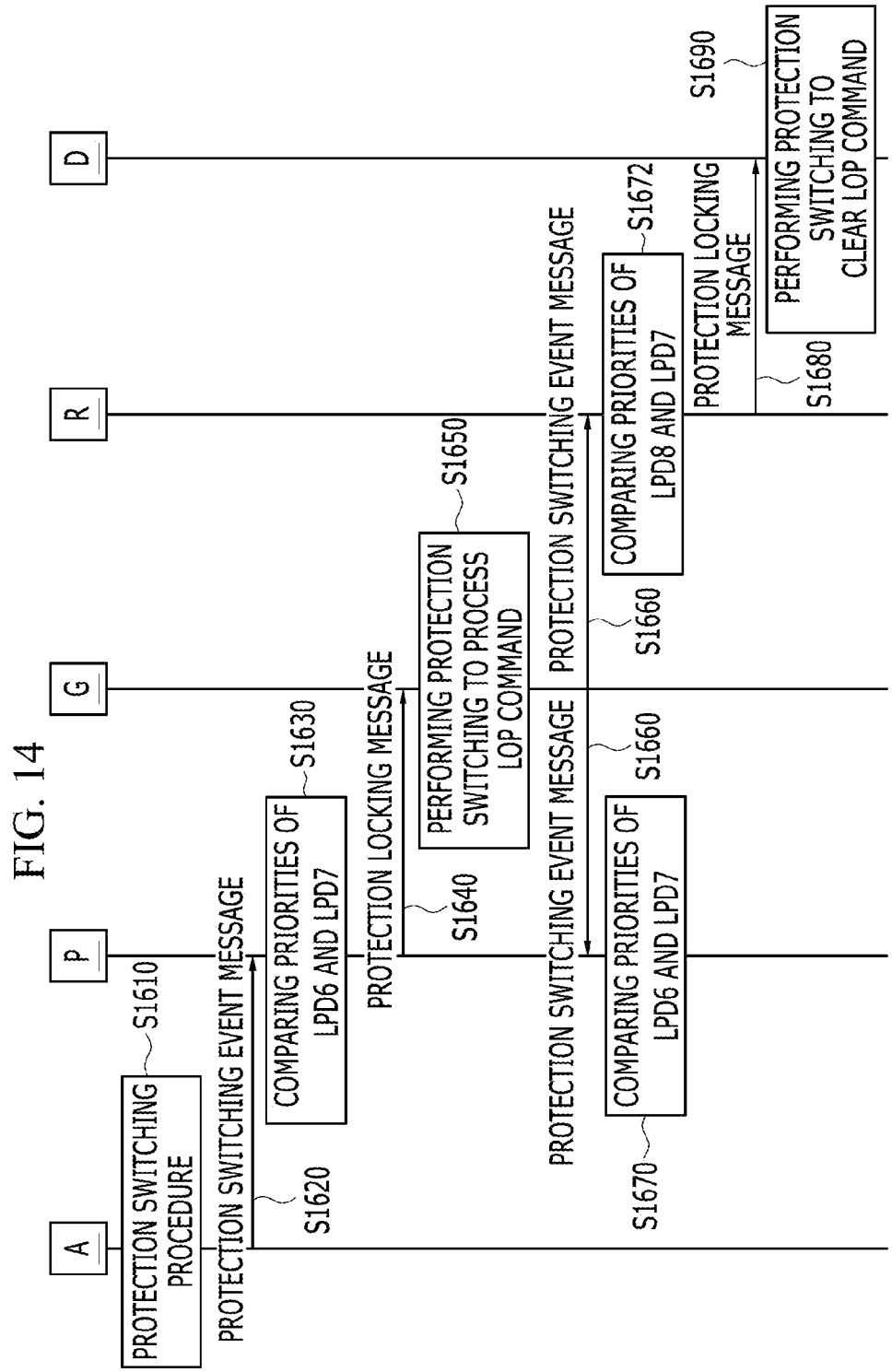

FIG. 11 and FIG. 13 show examples of protection switching occurrence in the network shown in FIG. 10. FIG. 12 and FIG. 14 are schematic flowcharts of a shared mesh protection switching method according to an embodiment of the present invention.

Referring to FIG. 10 again, the shared mesh protection domain includes three end-to-end linear protection domains as follows.

1. End-to-end linear protection domain LPD6: a working path W6 composed of nodes A, B, and C, and a protection path P6 composed of nodes A, P, Q, and C 2. End-to-end linear protection domain LPD7: a working path W7 composed of nodes G, H, and J, and a protection path P7 composed of nodes G,P,Q,R,S, and J 3. End-to-end linear protection domain LPD8: a working path W8 composed of nodes D, E, and F, and a protection path P8 composed of nodes D,R,S, and F It is assumed that the protection switching priority is the end-to-end linear protection domain LPD6>the end-to-end linear protection domain LPD7>the end-to-end linear protection domain LPD8, and all working paths are protected by 1:1 bidirectional protection switching.

As shown in FIG. 11, it is assumed that a unidirectional failure occurs in the working path W7 in the direction from the node H to the node G.

Referring to FIG. 11 and FIG. 12, the node G detects the failure, and initiates a protection switching for the failed working path W7 (S1410). Simultaneously, the node G generates a protection switching event message saying that a protection switching event happened, and sends the message to the nodes P and R that are SENs of the unidirectional working path (J→H→G) (S1420).

The SEN P compares the protection switching priority of the end-to-end linear protection domain LPD7 with that of the end-to-end linear protection domain LPD6 (S1430). In this example, since the protection switching priority of the end-to-end linear protection domain LPD6 is higher than that of the end-to-end linear protection domain LPD7, the SEN P does not take an action to the node A. The SEN R compares the protection switching priority of the end-to-end linear protection domain LPD7 with that of the end-to-end linear protection domain LPD8 (S1432). Since the protection switching priority of the end-to-end linear protection domain LPD8 is lower than that of the end-to-end linear protection domain LPD7, the SEN R sends a protection locking message requesting LoP to the node D (S1440).

The node D takes the protection locking message as an input to the protection switching and follows the protection switching procedure to process the LoP command (S1450).

Since the end-to-end linear protection domain LPD7 operates in the 1:1 bidirectional protection switching, the node J also changes its bridge and selector state to synchronize with the node G. Therefore, the node J sends the protection switching event message to the nodes S and Q that are SENs of the path G→H→J. As described in the steps S1430 to S1450, the SEN (S) sends the protection locking message to the node F while the SEN Q does not take an action to the node C.

While the end-to-end linear protection domain LPD7 is in the protection state with its normal traffic flowing through the protection path P7, another unidirectional failure may occur on the working path W6 in the direction from the node B to node A, as shown in FIG. 13.

Referring to FIG. 13 and FIG. 14, the node A detects the failure, and initiates the protection switching for the failed working path W6 (S1610). Simultaneously, the node A generates a protection switching event message saying that a protection switching event happened, and sends the message to the nodes P that is a SEN of the unidirectional working path (C→B→A) (S1620).

The SEN P compares the protection switching priority of the end-to-end linear protection domain LPD6 with that of the end-to-end linear protection domain LPD7 (S1630). In this example, since the protection switching priority of the end-to-end linear protection domain LPD7 is lower than that of the end-to-end linear protection domain LPD6, the SEN P sends a protection locking message requesting LoP to the node G (S1640). The node G takes the protection locking message as an input of the protection switching, and follows the protection switching procedure to process the LoP command (S1650). When the end-to-end linear protection domain LPD7 is forced to lock its protection path P7, it may try to find another available path for sending its normal traffic. At this time, m:n protection switching or other recovery mechanism may be used.

As the node G changes its selector state from the protection path to the working path, it transmits the protection switching event message saying that the protection switching event has been cleared to the nodes P and R that are SENs of the unidirectional working path (J→H→G) (S1660).

The SEN P compares the protection switching priority of the end-to-end linear protection domain LPD7 with that of the end-to-end linear protection domain LPD6 (S1670). Since the protection switching priority of the end-to-end linear protection domain LPD6 is higher than that of the end-to-end linear protection domain LPD7, the SEN P does not take an action to the node A. The SEN R compares the protection switching priority of the end-to-end linear protection domain LPD7 with that of the end-to-end linear protection domain LPD8 (S1672). Since the protection switching priority of the end-to-end linear protection domain LPD8 is lower than that of the end-to-end linear protection domain LPD7, the SEN R sends a protection locking message requesting clearance of the LoP to the node D (S1680).

The node D takes the protection locking message as an input of the protection switching and follows the protection switching procedure to clear the LoP command (S1690).

A shared mesh protection switching apparatus that can perform the shared mesh protection switching method described with reference to FIG. 1 to FIG. 14 will be described with reference to FIG. 15.

Figure 15:
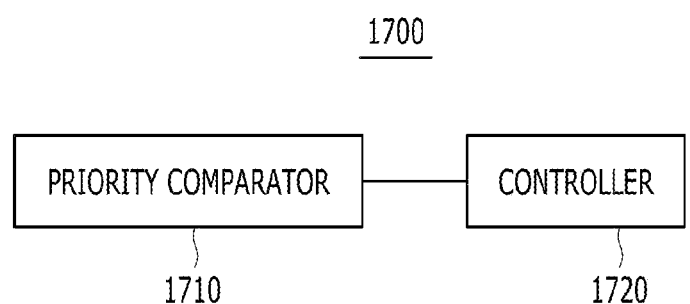
FIG. 15 is a schematic block diagram of a shared mesh protection switching apparatus according to an embodiment of the present invention.

FIG. 15 is a schematic block diagram of a shared mesh protection switching apparatus according to an embodiment of the present invention, and the shared mesh protection switching apparatus is included in a node.

Referring to FIG. 15, a shared mesh protection switching apparatus 1700 includes a priority comparator 1710 and a controller 1720.

The priority comparator 1710 compares the priority of the end-to-end linear protection domain where the protection switching event occurs with that of the end-to-end linear protection domain that shares the resource for the protection path with the corresponding end-to-end linear protection domain. The controller 1720 receives the protection switching report or detects the protection switching event. Further, the controller 1720 transmits a message commanding or clearing the prohibition of protection switching to an end node according to the comparison result of the priority comparator 1710. Alternately, when the shared mesh protection switching apparatus is formed in the end node, the controller 1720 restricts the protection switching by itself.

Embodiments of the present invention are not embodied only by a method and apparatus. Alternatively, the embodiments may be embodied by a program performing functions, which correspond to the configuration of the embodiments of the present invention, or a recording medium on which the program is recorded.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:
1. A method for protection switching in a shared node of a telecommunication network, the telecommunication network including first and second end-to-end linear protection domains, each end-to-end linear protection domain having two end nodes that are connected by a working path and a protection path that includes at least one intermediate node, protection resources of the first and second end-to-end linear protection domains being shared at the shared node, which is a common intermediate node of the first and second end-to-end linear protection domains, the method comprising:
receiving, by the shared node from one of the end nodes of the first end-to-end linear protection domain, a first protection switching event message notifying that a protection switching event occurs; and
determining, by the shared node, whether to prohibit protection switching on the second end-to-end linear protection domain by comparing a priority of the first end-to-end linear protection domain with a priority of the second end-to-end linear protection domain.

2. The method of claim 1, wherein determining whether to prohibit protection switching comprises transmitting a first protection locking message requesting a Lockout of Protection (LoP) to one of the end nodes of the second end-to-end linear protection domain when the priority of the second end-to-end linear protection domain is lower than the priority of the first end-to-end linear protection domain.

3. The method of claim 2, wherein the one end node of the second end-to-end linear protection domain processes the LoP upon receipt of the first protection locking message.

4. The method of claim 2, further comprising:
receiving, by the shared node from the one end node of the first end-to-end linear protection domain, a second protection switching event message notifying that the protection switching event is cleared in the first end-to-end linear protection domain; and
transmitting a second protection locking message requesting clearance of the LoP to the one end node of the second end-to-end linear protection domain.

5. The method of claim 4, wherein the one end node clears the LoP in the second end-to-end linear protection domain upon receipt of the second protection locking message.

6. The method of claim 1, wherein in the step of determining whether to prohibit protection switching, the protection switching is not prohibited in the second end-to-end linear protection domain when the priority of the second end-to-end linear protection domain is higher than the priority of the first end-to-end linear protection domain.

7. The method of claim 1, wherein determining whether to prohibit protection switching comprises transmitting a first protection locking message requesting a Lockout of Protection (LoP) to one of the end nodes of the second end-to-end linear protection domain when the priority of the second end-to-end linear protection domain is equal to the priority of the first end-to-end linear protection domain.

8. The method of claim 1, wherein the first protection switching event message comprises information on an amount of network resources required to perform the protection switching in the first end-to-end linear protection domain.

9. A method for protection switching in an end node of a first end-to-end linear protection domain of a telecommunication network, the telecommunication network including the first end-to-end linear protection domain and a second end-to-end linear protection domain, each end-to-end linear protection domain having two end nodes that are connected by a working path and a protection path that includes at least one intermediate node, the first and second end-to-end linear protection domains having a shared node that is a common intermediate node of the two end-to-end linear protection domains, the method comprising:
receiving, by the end node, a protection locking message from the shared node, which sends the protection locking message upon detecting that a protection switching event occurs in the second end-to-end linear protection domain and that a protection switching priority of the first end-to-end linear protection domain is lower than a protection switching priority of the second end-to-end linear protection domain; and
processing or clearing, by the end node, a Lockout of Protection (LoP) in the first end-to-end linear protection domain according to the protection locking message.

10. The method of claim 9, wherein the protection locking message is a message requesting the LoP when a transmission state in the second end-to-end linear protection domain is set to the protection path.

11. The method of claim 10, further comprising transmitting a protection switching event message notifying that the protection switching event is cleared to the shared node when the transmission state of the first end-to-end linear protection domain is switched from the protection path to the working path by the LoP of the first end-to-end linear protection domain.

12. The method of claim 11, wherein
the telecommunication network further includes a third end-to-end linear protection domain having two end nodes that are connected by a working path and a protection path that includes at least one intermediate node, the first and third end-to-end linear protection domains having another shared node that is a common intermediate node of the first and third end-to-end linear protection domains, and
the method further includes transmitting the protection switching event message to the another shared node.

13. The method of claim 9, wherein the protection locking message is a message requesting clearance of the LoP when a transmission state of the second end-to-end linear protection domain is set to the working path.

14. A method for protection switching in a shared node of a telecommunication network, the telecommunication network including first and second end-to-end linear protection domains that share protection resources, each end-to-end linear protection domain having two end nodes that are connected by a working path and a protection path that includes at least one intermediate node, the shared node being a common intermediate node of the first and second end-to-end linear protection domains, the method comprising:
comparing, by the shared node, a priority of the first end-to-end linear protection domain with a priority of the second end-to-end linear protection domain upon detecting that a protection switching event occurs in the first end-to-end linear protection domain; and
prohibiting, by the shared node, protection switching on the second end-to-end linear protection domain upon detecting that the priority of the second end-to-end linear protection domain is lower than the priority of the first end-to-end linear protection domain.

15. The method of claim 14, wherein the priorities of the first and the second end-to-end linear protection domains are protection switching priorities of the first and the second end-to-end linear protection domains, respectively.

16. The method of claim 14, wherein the priorities of the first and the second end-to-end linear protection domains are priorities of the working paths of the first and the second end-to-end linear protection domains, respectively.

17. The method of claim 16, further comprising receiving a notification of the protection switching event occurrence and information on the working path of the first end-to-end linear protection domain from one of the end nodes of the first end-to-end linear protection domain.

18. The method of claim 14, further comprising receiving a notification of the protection switching event occurrence from one of the end nodes of the first end-to-end linear protection domain.

19. The method of claim 14, further comprising detecting the protection switching event occurrence by detecting a protection switching message exchanged between the end nodes of the first end-to-end linear protection domain.

* * * * *